United States Patent [19]
Kanai

[11] Patent Number: 6,131,538
[45] Date of Patent: Oct. 17, 2000

[54] APPARATUS FOR CONTROLLING INTERNAL COMBUSTION ENGINE IN HYBRID VEHICLE AND METHOD OF THE SAME

[75] Inventor: Hiroshi Kanai, Susono, Japan

[73] Assignee: Toyota Jidosha Kabushiki Kaisha, Toyota, Japan

[21] Appl. No.: 09/080,204

[22] Filed: May 18, 1998

[30] Foreign Application Priority Data

Jun. 6, 1997 [JP] Japan .................................... 9-165131

[51] Int. Cl.[7] ...................................................... F02B 65/00
[52] U.S. Cl. .............................. 123/2; 180/65.2; 73/116
[58] Field of Search ................................ 180/65.2, 65.8, 180/54.1, 65.1; 123/2; 73/116, 117.3

[56] References Cited

U.S. PATENT DOCUMENTS

| | | | |
|---|---|---|---|
| 3,938,377 | 2/1976 | Converse, III et al. | 73/117 |
| 4,129,034 | 12/1978 | Niles et al. | 73/117.3 |
| 5,063,901 | 11/1991 | Kaneyasu et al. | 123/406.13 |
| 5,417,109 | 5/1995 | Scourtes | 73/116 |
| 5,492,189 | 2/1996 | Kriegler et al. | |
| 5,697,466 | 12/1997 | Moroto et al. | 180/65.2 |

FOREIGN PATENT DOCUMENTS 6-197406  7/1994  Japan .

OTHER PUBLICATIONS

Patent Abstract of Japan, Publication No. 10073517, Publication Date Mar. 17, 1998.

*Primary Examiner*—Brian L. Johnson
*Assistant Examiner*—Bridget Avery
*Attorney, Agent, or Firm*—Oliff & Berridge, PLC

[57] ABSTRACT

In a hybrid vehicle with an internal combustion engine and a motor mounted thereon, operation of the internal combustion engine stops when a battery has a large remaining charge, so that inspection of the internal combustion engine can not be carried out under such conditions. The present invention controls the internal combustion engine to drive in an inspection mode that is different from a normal driving state at the time of inspection of the internal combustion engine. A control unit mounted to control operation of the internal combustion engine and the motor carries out an inspection control routine in the following manner. The inspection of the internal combustion engine is carried out while a terminal T of a diagnosis connector is connected with a terminal E. The control procedure thus keeps the internal combustion engine driving irrespective of the remaining charge of the battery while the terminals T and E are connected with each other. Inspection of exhaust is carried out, while the connection of the terminal T with the terminal E is released. The control procedure accordingly keeps the internal combustion engine driving irrespective of the remaining charge of the battery until a predetermined time period has elapsed since the release of the connection. The structure of the present invention prevents the operation of the internal combustion engine from being stopped at the time of inspection and enable the inspection of the internal combustion engine.

5 Claims, 8 Drawing Sheets

APPARATUS FOR CONTROLLING INTERNAL COMBUSTION ENGINE IN HYBRID VEHICLE AND METHOD OF THE SAME

BACKGROUND OF THE INVENTION

1. Field of the Invention

The present invention relates to an apparatus for controlling operation of an internal combustion engine in a hybrid vehicle with the internal combustion engine and a motor mounted thereon. More specifically the present invention pertains to an apparatus for controlling the driving state of the internal combustion engine during an inspection of the operation of the internal combustion engine mounted on the hybrid vehicle.

2. Description of the Related Art

There are two types of hybrid vehicles; one type with an engine that is applicable as a driving source of the vehicle (parallel-type hybrid vehicle) and the other type with an engine that is not directly applicable as a driving source of the vehicle but is mainly used to drive a generator (series-type hybrid vehicle). Both types of the hybrid vehicles can run using only a motor as the driving source while the engine is at a stop. The parallel-type hybrid vehicle uses the engine as the main driving source during a normal run, but may be driven under the ceased condition of the engine. The latter condition is applied when the engine power is not required, for example, during reduction of speed and during a drive on a down-slope, and when a drive with the motor is more suitable than a drive with the engine, for example, at the time of initial acceleration. The series-type hybrid vehicle starts and stops operation of the engine according to the charging state of the battery which supplies electric power to the motor. By way of example, when the remaining charge of the battery is lowered, the engine is driven to activate the generator and charge the battery. When the battery has the sufficient remaining charge, on the other hand, operation of the engine is stopped even during a drive. In the hybrid vehicle, even under the active state of a starter switch, the engine starts and stops operation according to the remaining charge of a storage battery and the driving conditions of the vehicle. In the conventional vehicle with only the engine as the driving source, the engine keeps driving unless the starter switch is turned off. This is one of the main differences between the hybrid vehicle and the conventional vehicle with only the engine as the driving source.

It is required to inspect the engine periodically or at the time of malfunction in the hybrid vehicle as well as the conventional vehicle with only the engine as the driving source. The engine mounted on the hybrid vehicle essentially has the same structure as that of the engine mounted on the conventional vehicle. The process of inspecting the operation of the engine in the conventional vehicle is accordingly applicable to the hybrid vehicle. The process of inspecting the operation of the engine in the conventional vehicle is described briefly with the drawing of FIG. 9.

FIG. 9A schematically illustrates one arrangement in an engine room in the conventional vehicle. An engine 150a, an EFIECU 170a for controlling the operation of the engine 150a, a diagnosis connector 172a used for inspection of the engine 150a are included in the engine room. The diagnosis connector 172a is an essential element used for the inspection of the engine 150a.

FIG. 9B is an enlarged view illustrating the diagnosis connector 172a. As shown in FIG. 9B, terminals of the diagnosis connector 172a are connected to each other via a check wire 240a for inspection of the engine 150a. The terminals to be connected are selected according to the item of inspection. FIG. 9C is a plan view illustrating the diagnosis connector 172a. By way of example, for inspection of the ignition timing of the engine 150a, terminals T and E shown in FIG. 9C are connected to each other via the check wire 240a. The terminal T is connected to a signal input unit of the EFIECU 170a and is generally pulled up to a predetermined voltage in the EFIECU 170a. Connection of the terminal T with the terminal E causes the terminal T to be grounded. At a normal run, the EFIECU 170a drives the engine 150a while varying the ignition timing of the engine 150a according to the revolving speed of the engine 150a. In case that the voltage of the terminal T is equal to the grounded voltage, on the other hand, the EFIECU 170a drives the engine 150a while fixing the ignition timing to a predetermined standard ignition timing. When the engine 150a is driven in this state, the standard ignition timing may be measured and regulated. Other inspection items carried out under the connecting state of the diagnosis connector 172a include reading the ratio of air to fuel (the air/fuel ratio) when the engine 150a is at an idle and reading the diagnosis code representing the failure of the engine 150a. These inspections are carried out while the terminal T is linked with the terminal E.

Some items of inspection of the engine 150 are carried out without connecting any two terminals of the diagnosis connector 172a. One example of such items is inspection of exhaust, which determines whether or not the concentrations of toxic components, such as CO and HC, included in the exhaust from the engine 150 satisfy predetermined criteria. As mentioned above, when the terminal T and the terminal E of the diagnosis connector 172a are connected with each other, the engine 160a is driven at the standard ignition timing that does not depend upon the revolving speed of the engine 150a. This means that the engine 150a is driven under the driving conditions different from those at a normal run. The inspection of the exhaust should, however, be carried out under the same conditions as those at a normal run. It is accordingly required to drive the engine 150 at a predetermined revolving speed and carry out the inspection without connecting any two terminals of the diagnosis connector 172a. Another inspection item carried out without connecting any two terminals of the diagnosis connector 172a is measurement of the idling speed of the engine 150a.

In the hybrid vehicle, it is required to drive the internal combustion engine in a variety of driving states at the time of inspection of the operation of the internal combustion engine. As discussed previously, however, the hybrid vehicle stops the operation of the internal combustion engine when predetermined conditions are fulfilled, for example, when the battery has sufficient electric power. In some cases, the internal combustion engine stops its operation at the time of inspection according to the charging state of the battery. This causes troubles in inspection. This problem is characteristic of the hybrid vehicle and does not arise in the conventional vehicle with only the internal combustion engine as the driving source.

SUMMARY OF THE INVENTION

The object of the present invention is thus to provide an apparatus that controls operation of an internal combustion engine and enables inspection of the operation of the internal combustion engine to be carried out without any significant troubles.

At least part of the above and the other related objects are realized by an apparatus that controls operation of an internal combustion engine in a hybrid vehicle with the internal combustion engine and a motor mounted thereon. The apparatus includes: an operation stop unit which stops operation of the internal combustion engine when an essential condition characteristic of the hybrid vehicle is satisfied among conditions for stopping the operation of the internal combustion engine; a detection unit which determines an inspection of the operation of the internal combustion engine is in progress ; and a continuous operation control unit which controls the operation of the internal combustion engine when the detection unit determines that the inspection of the operation of the internal combustion engine is in progress, and thereby keeps a predetermined driving state suitable for the inspection of the operation of the internal combustion engine even when the essential condition characteristic of the hybrid vehicle is satisfied among the conditions for stopping the operation of the internal combustion engine.

The present invention is also directed to a method of controlling operation of an internal combustion engine in a hybrid vehicle with the internal combustion engine and a motor mounted thereon. The method includes the steps of:

(a) determining an inspection of operation of the internal combustion engine is in progress;

(b) stopping the operation of the internal combustion engine when an essential condition characteristic of the hybrid vehicle is satisfied among conditions for stopping the operation of the internal combustion engine and when it is determined in the step (a) that the inspection of the operation of the internal combustion engine is not in progress; and (c) controlling the operation of the internal combustion engine when it is determined in the step (a) that the inspection of the operation of the internal combustion engine is in progress, and thereby keeping a predetermined driving state suitable for the inspection of the operation of the internal combustion engine even when the essential condition characteristic of the hybrid vehicle is satisfied among the conditions for stopping the operation of the internal combustion engine.

In the apparatus for and the method of controlling operation of the internal combustion engine according to the present invention, it is determined whether or not inspection of the operation of the internal combustion engine is in progress. This determines whether the hybrid vehicle is at a normal run or in the course of inspection of the operation of the internal combustion engine. When it is determined that the inspection of the operation of the internal combustion engine is in progress, the internal combustion engine is kept driving in the predetermined driving state suitable for the inspection, whether or not the essential condition characteristic of the hybrid vehicle is satisfied among the conditions for stopping the operation of the internal combustion engine. This structure enables the inspection of the operation of the internal combustion engine mounted on the hybrid vehicle to be carried out without any significant troubles.

In the apparatus and the method of the present invention, the determination of whether or not the inspection of the operation is in progress may be carried out before or after the determination of whether or not the essential ceasing condition characteristic of the hybrid vehicle is satisfied. One possible procedure carries out the determination of whether or not the essential ceasing condition is satisfied only when it is determined that the inspection of the operation is not under way. Another possible procedure carries out the determination of whether or not the inspection of the operation is in progress only when the essential ceasing condition is satisfied.

In accordance with one preferable application, the apparatus further includes an output unit which outputs a drive control signal to instruct a drive of the internal combustion engine in the predetermined driving state suitable for the inspection, wherein the detection unit carries out the determination based on detection of the drive control signal.

In the apparatus of this structure, detection of the drive control signal determines that the inspection of the operation of the internal combustion engine is in progress. The procedure of inspecting the operation of the internal combustion engine mounted on the conventional vehicle generally utilizes the drive control signal that enables the internal combustion engine to be driven in the predetermined driving state suitable for the inspection. This procedure is also applicable to the hybrid vehicle. The apparatus of this preferable structure thus enables the inspection of the operation of the internal combustion engine to be carried out without any troubles according to the general inspection procedure.

In accordance with another preferable application, the apparatus further includes an output unit which outputs a drive control signal to instruct a drive of the internal combustion engine in the predetermined driving state suitable for the inspection, wherein the detection unit determines that the inspection of the operation of the internal combustion engine is in progress while the drive control signal is detected and until a predetermined time period has elapsed since the drive control signal was changed from a state of detection to a state of non-detection.

In the apparatus of this structure, detection of the drive control signal determines that the inspection of the operation of the internal combustion engine is in progress. It is also determined that the inspection of the operation of the internal combustion engine is in progress until a predetermined time period has elapsed since the drive control signal was changed from the state of detection to the state of non-detection. Some items of inspection of the internal combustion engine, for example, inspection of exhaust, should be carried out without using the drive control signal but while the internal combustion engine is driven under the same conditions as those at a normal run. These inspection items are generally carried out after the inspection items using the drive control signal. The apparatus of this preferable structure keeps the internal combustion engine driving not only during the inspection using the drive control signal but until a predetermined time period has elapsed since the drive control signal was changed to the state of non-detection after completion of the inspection. The apparatus of this preferable structure thus enables the inspection of the operation of the internal combustion engine to be carried out without any troubles according to the general inspection procedure.

The present invention is further directed to an apparatus that controls operation of an internal combustion engine in a hybrid vehicle with the internal combustion engine and a motor mounted thereon. The apparatus includes: a first electronic control unit which stops operation of the internal combustion engine when an essential condition characteristic of the hybrid vehicle is satisfied among conditions for stopping the operation of the internal combustion engine; an inspection terminal which is used only to inspect the operation of the internal combustion engine; a detector which detects a connecting state of the inspection terminal; and a second electronic control unit which controls the operation of the internal combustion engine at least when the detector detects a connecting state that is supposed to be detected during the inspection of the operation of the internal combustion engine, and thereby keeps a predetermined driving state suitable for the inspection of the operation of the internal combustion engine even when the essential condition characteristic of the hybrid vehicle is satisfied among the conditions for stopping the operation of the internal combustion engine.

There are other possible applications of the present invention. In accordance with the first application, the apparatus further includes an output unit which outputs an inspection requirement signal to instruct continuous operation of the internal combustion engine at the time of inspection, wherein the detection unit carries out the determination based on detection or non-detection of the inspection requirement signal.

In accordance with the second application, the apparatus further includes an output unit which outputs an inspection requirement signal to instruct continuous operation of the internal combustion engine at the time of inspection, wherein the detection unit determines that the inspection of the operation of the internal combustion engine is in progress until a predetermined time period has elapsed since the inspection requirement signal was changed from a state of detection to a state of non-detection.

In the apparatus of the first application, detection of the inspection requirement signal determines that the inspection of the operation of the internal combustion engine is in progress. In the apparatus of the second application, it is determined that the inspection of the operation of the internal combustion engine is in progress until a predetermined time period has elapsed since the inspection requirement signal was changed from the state of detection to the state of non-detection. The inspection requirement signal may be different from the drive control signal of the internal combustion engine. The apparatus of this structure enables both the inspection items using the drive control signal and the inspection items without using the drive control signal to be carried out without any significant troubles.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
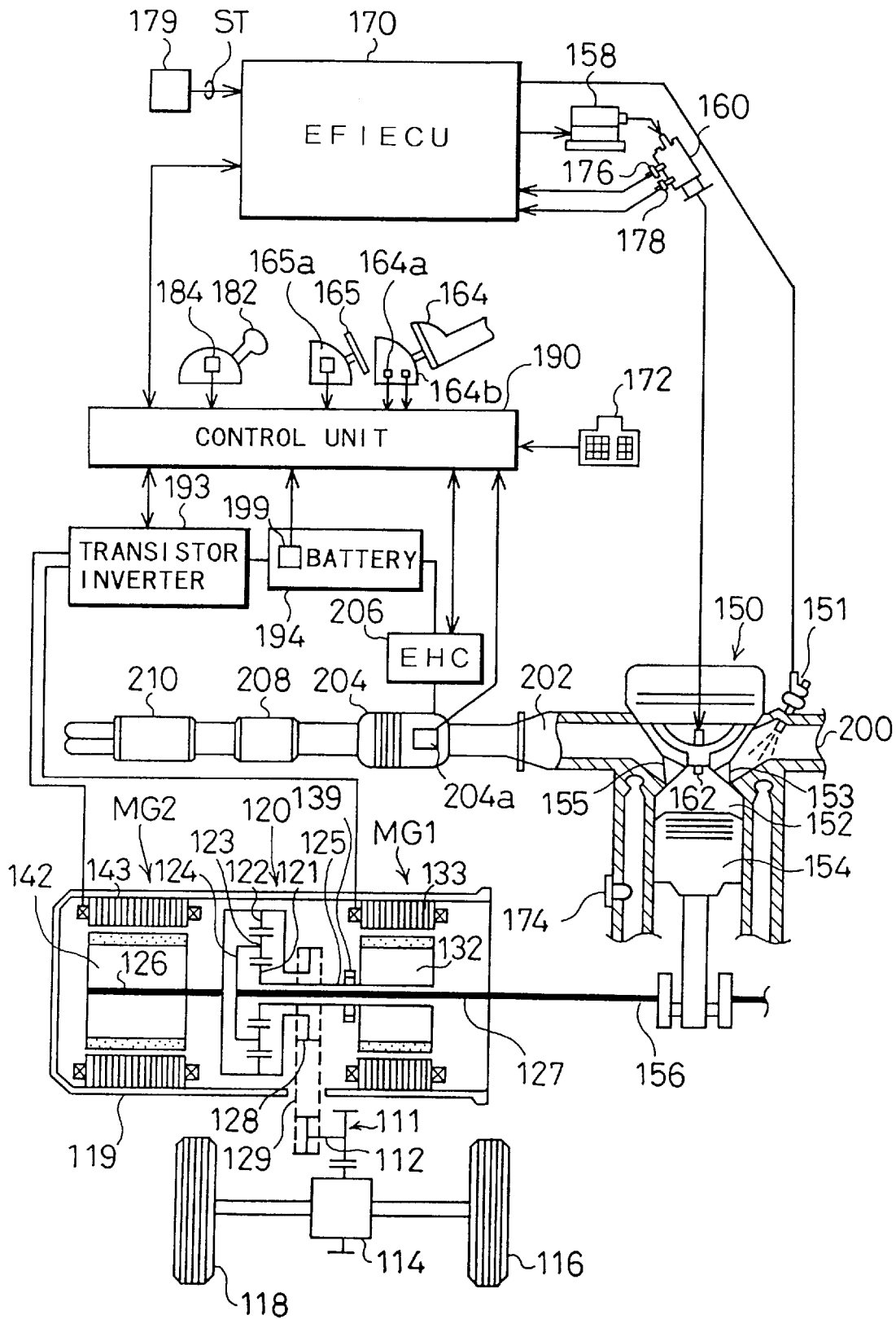
FIG. 1 schematically illustrates structure of a hybrid vehicle embodying the present invention.

Some modes of carrying out the present invention are described below as preferred embodiments. As illustrated in FIG. 1, the hybrid vehicle primarily includes a power system for generating a driving force, a control system for the power system, a power transmission system for transmitting the driving force from a driving source to driving wheels 116 and 118, and a driving control unit. The power system has a system including an engine 150 and another system including two motors MG1 and MG2. The control system includes an electronic control unit (hereinafter referred to as EFIECU) 170 for chiefly controlling operation of the engine 150, a control unit 190 for chiefly controlling operation of the motors MG1 and MG2, a variety of sensors for detecting, inputting, and outputting signals required for the EFIECU 170 and the control unit 190, and a diagnosis connector 172. Although the internal structure of the EFIECU 170 and the control unit 190 is not specifically illustrated, the EFIECU 170 and the control unit 190 are one-chip microcomputers respectively including a CPU, a ROM, and a RAM, wherein the CPU carries out a variety of control operations discussed below according to programs recorded in the ROM. The engine controller of this embodiment includes the EFIECU 170, the control unit 190, and the diagnosis connector 172.

The engine 150 feeds a mixture of the air ingested through an air inlet 200 and a fuel, for example, gasoline, injected from a fuel injection valve 151 into a combustion chamber 152 and converts motions of a piston 154 pressed down by the explosion of the air/fuel mixture to rotational motions of a crankshaft 156. An ignition plug 162 converts high voltage led from an igniter 158 via a distributor 160 to electric spark, and the air/fuel mixture is ignited with the electric spark for combustion and explosion. The hot exhaust after the combustion of the air/fuel mixture goes through an exhaust outlet 202 and then through an exhaust system including a catalytic converter 204, a sub-muffler 208, and a main muffler 210 and is eventually discharged to the atmosphere. The catalytic converter 204 treats the emission, that is, the toxic components, such as HC, CO, and NOx, included in the exhaust from the internal combustion engine, by catalytic re-combination with a three-way catalyst. The catalytic converter can not convert the emission sufficiently unless the catalyst reaches an active temperature (approximately 400° C. in this embodiment). There is accordingly an electric heater for heating the catalyst (hereinafter referred to as EHC) 206 with a supply of electricity from a battery 194.

The EFIECU 170 controls operation of the engine 150. Controls of the engine 150 carried out by the EFIECU 170 include ignition timing control of the ignition plug 162 corresponding to the revolving speed of the engine 150 and fuel injection quantity control corresponding to the amount of intake air. In order to enable the EFIECU 170 to control the engine 160, A variety of sensors for detecting the driving conditions of the engine 150 are connected to the EFIECU 170. These sensors include a speed sensor 176 and an angle sensor 178 mounted on the distributor 160 for measuring the revolving speed and the rotational angle of the crankshaft 156. A starter switch 179 for detecting a state ST of an ignition key is also connected to the EFIECU 170. Other sensors and switches connected to the EFIECU 170 are omitted from the illustration.

The motor MG1 is constructed as a synchronous motor/generator and includes a rotor 132 with a plurality of permanent magnets attached to the outer circumference thereof and a stator 133, which three-phase coils for producing a revolving magnetic field are wound thereon. The stator 133 is a laminate of thin, non-directional electromagnetic steel plates and is fixed to a casing 119. The motor MG1 functions as a motor that rotates and drives the rotor 132 through the interaction between the magnetic field produced by the permanent magnets on the rotor 132 and the magnetic field produced by the three-phase coils on the stator 133, and in some cases, also as a generator that produces an electromotive force between both ends of the three-phase coils on the stator 133 through this interaction.

Like the motor MG1, the motor MG2 is constructed as a synchronous motor/generator and includes a rotor 142 with a plurality of permanent magnets attached to the outer circumference thereof and a stator 143, which three-phase coils for producing a revolving magnetic field are wound thereon. The stator 143 of the motor MG2 is also a laminate of thin, non-directional electromagnetic steel plates and is fixed to the casing 119. In the same manner as the motor MG1, the motor MG2 functions either as a motor or as a generator.

These motors MG1 and MG2 are electrically connected to the battery 194 and the control unit 190 via a transistor inverter 193 including a plurality of transistors used for switching operations. The EHC 206 and the variety of sensors and switches are electrically connected to the control unit 190. The sensors and switches connected to the control unit 190 include an accelerator pedal position sensor 164a, an accelerator full-close switch 164b, a brake pedal position sensor 165a, a gearshift position sensor 184, a remaining charge member 199 of the battery 194, and a catalyst temperature sensor 204a.

The diagnosis connector 172 is also connected to the control unit 190 and used for inspection of the engine 150. As discussed previously with the drawing of FIG. 9 regarding the conventional vehicle, when a check wire 240a connects predetermined terminals with each other, the engine 150 is driven in a variety of predetermined driving conditions. When the check wire 240a connects predetermined terminals of the diagnosis connector 172 with each other, a diagnosis code is output. The diagnosis code represents the state of failure of the engine 150 or another constituent. The diagnosis codes regarding the abnormality of the engine 150 are recorded in the EFIECU 150, whereas the diagnosis codes regarding the abnormality of the motors MG1 and MG2 and those regarding the abnormality of the motor driving system including the transistor inverter 193 and the battery 194 are recorded in the control unit 190. The structure of the diagnosis connector 172 is similar to the structure illustrated in FIG. 9C regarding the conventional vehicle. When it is required to connect the diagnosis connector 172 for inspection of the engine 150, at least terminals T and E should be connected to each other and the terminal T gives the grounded voltage.

The method of controlling the motors MG1 and MG2 with the transistor inverter 193 is a known technique. A control signal is output from the control unit 190 to the transistor inverter 193 to switch on and off the respective transistors included in the transistor inverter 193. The switching operation leads to PWM control that changes the electric current flowing through the three-phase coils of the motors MGI and MG2 to quasi-sine waves. This causes the revolving magnetic fields to be formed respectively in the three-phase coils disposed on the stator 133 of the motor MC1 and in the three-phase coils disposed on the stator 143 of the motor MG2. The interaction between these revolving magnetic fields and the magnetic fields produced by the plurality of permanent magnets attached to the outer circumferences of the rotors 132 and 142 rotate the rotors 132 and 142.

The control unit 190 receives a variety of signals from the driving control unit and information, such as the remaining charge of the battery 194 and the catalyst temperature in the catalytic converter 204, and carries out controls of the driving state of the hybrid vehicle including control of the motors MG1 and MG2 and control of the supply of electricity to the EHC 206. The control unit 190 transmits various pieces of information to and from the EFIECU 170 for controlling the engine 150 through communication. The variety of signals from the driving control unit include an accelerator pedal position (step-on amount of an accelerator pedal) AP from the accelerator pedal position sensor 164a, the on-off state of the accelerator full-close switch 164b, a brake pedal position (step-on amount of a brake pedal) BP from the brake pedal position sensor 165a, and a gearshift position SP from the gearshift position sensor 184. The remaining charge meter 199 detects the remaining charge of the battery 194, and the catalyst temperature sensor 204a measures the catalyst temperature. The remaining charge meter 199 detects the remaining charge of the battery 194 by measuring the specific gravity of the electrolytic solution of the battery 194 or the total weight of the battery 194, by accumulating the values of charging and discharging currents and the time of charge and discharge, or by measuring the internal resistance when the electric current is flown by an instantaneous short circuit between terminals of the battery 194.

As described previously, in the hybrid vehicle, the engine 150 drives and stops according to the remaining charge of the battery 194 and the driving conditions of the vehicle. Such operations of the engine 150 are realized in the following manner through communication of information between the control unit 190 and the EFIECU 170.

The control unit 190 determines whether or not the engine 150 is being driven, based on the information from the EFIECU 170. In case that the engine 150 is at a stop, the control unit 190 determines whether or not the engine 150 should start driving, based on the various pieces of detectable information including the remaining charge of the battery 194. When it is determined that the engine 150 should start driving, the control unit, 190 controls the motor MG1 to crank and start the engine 150 and outputs a signal to instruct, a start of the engine 150 to the EFIECU 170. This signal includes a signal to instruct the driving state of the engine 150, such as a required torque, according to the requirements. The EFIECU 170 receives the signal and starts a drive of the engine 150 in the instructed state.

In case that the engine 150 is in drive, on the other hand, the control unit 190 determines whether or not the engine 150 should stop driving. When it is determined that the engine 150 should stop driving, the control unit 190 controls the motor MG1 to brake the rotation of the engine 150 and outputs a signal to instruct a stop of the engine 150 to the EFIECU 170. The EFIECU 170 receives the signal and stops the drive of the engine 150. Thus, the control unit 190, the motor MG1 and the EFIECU 170 comprise an operation stop unit.

The power transmission system has the following structure to transmit the driving force from the driving source to the driving wheels 116 and 118. The crankshaft 156 and a planetary carrier shaft 127 for transmitting power of the engine 150 and rotating shafts 125 and 126 for transmitting rotations of the motors MG1 and MG2 are mechanically connected to a power transmission gear 111 via a planetary gear 120 discussed later. The power transmission gear 111 is further connected to the left and the right driving wheels 116 and 118 via a differential gear 114.

The following describes the structure of the planetary gear 120 and the linkage of the crankshaft 156, the planetary carrier shaft 127, the rotating shaft 125 of the motor MG1, and the rotating shaft 126 of the motor MG2. The planetary gear 120 includes two coaxial gears, that, is, a sun gear 121 and a ring gear 122, and a plurality of planetary pinion gears 123 that are arranged between the sun gear 121 and the ring gear 122 and revolve round the sun gear 121 while rotating on their own respective axes. The sun gear 121 is connected to the rotor 132 of the motor MG1 via the hollow sun gear shaft 125 having an axial center pierced by the planetary carrier shaft 127. The ring gear 122 is connected to the rotor 142 of the motor MG2 via the ring gear shaft 126. The planetary pinion gears 123 are connected to the planetary carrier shaft 127 via a planetary carrier 124 for supporting their rotating shafts, whereas the planetary carrier shaft 127 is connected to the crankshaft 156. As is known on the mechanics, in the planetary gear 120, determination of the input and output powers to and from any two of the three shafts, the sun gear shaft 125, the ring gear shaft 126, and the crankshaft 156, automatically determines the input and output powers to and from the residual one shaft.

A power feed gear 128 for taking out the power is interposed between the ring gear 122 and the motor MG1 and connected to the ring gear 122. The power feed gear 128 is linked with the power transmission gear 111 via a chain belt 129, so that power is transmitted between the power feed gear 128 and the power transmission gear 111. The hybrid vehicle may run only with the motor MG2 as the driving source or with both the engine 150 and the motor MG2 as the driving source, based on the above structure and the characteristics of the planetary gear 120. More concretely, the hybrid vehicle stops operation of the engine 150 and runs only with the motor MG2 when the engine power is not required, for example, during reduction of speed and during a drive on a down-slope, and at the time of initial acceleration. In the normal driving state, the hybrid vehicle drives the engine 150 as the main driving source while using the power of the motor MG2 for the run. When the hybrid vehicle runs with both the engine 150 and the motor MG2 as the driving source, the engine 150 can be driven at the driving point of desirable efficiency according to the required torque and the torque generated by the motor MG2. Compared with the conventional vehicle using only the engine 150 as the driving source, the hybrid vehicle of this structure has advantages, that is, saves the resource and reduces the toxicity of the exhaust. Rotation of the crankshaft 156 is transmitted to the motor MG1 via the planetary carrier shaft 127 and the sun gear shaft 125, so that the hybrid vehicle may run while the motor MG1 generates electricity through operation of the engine 150.

Figure 2:
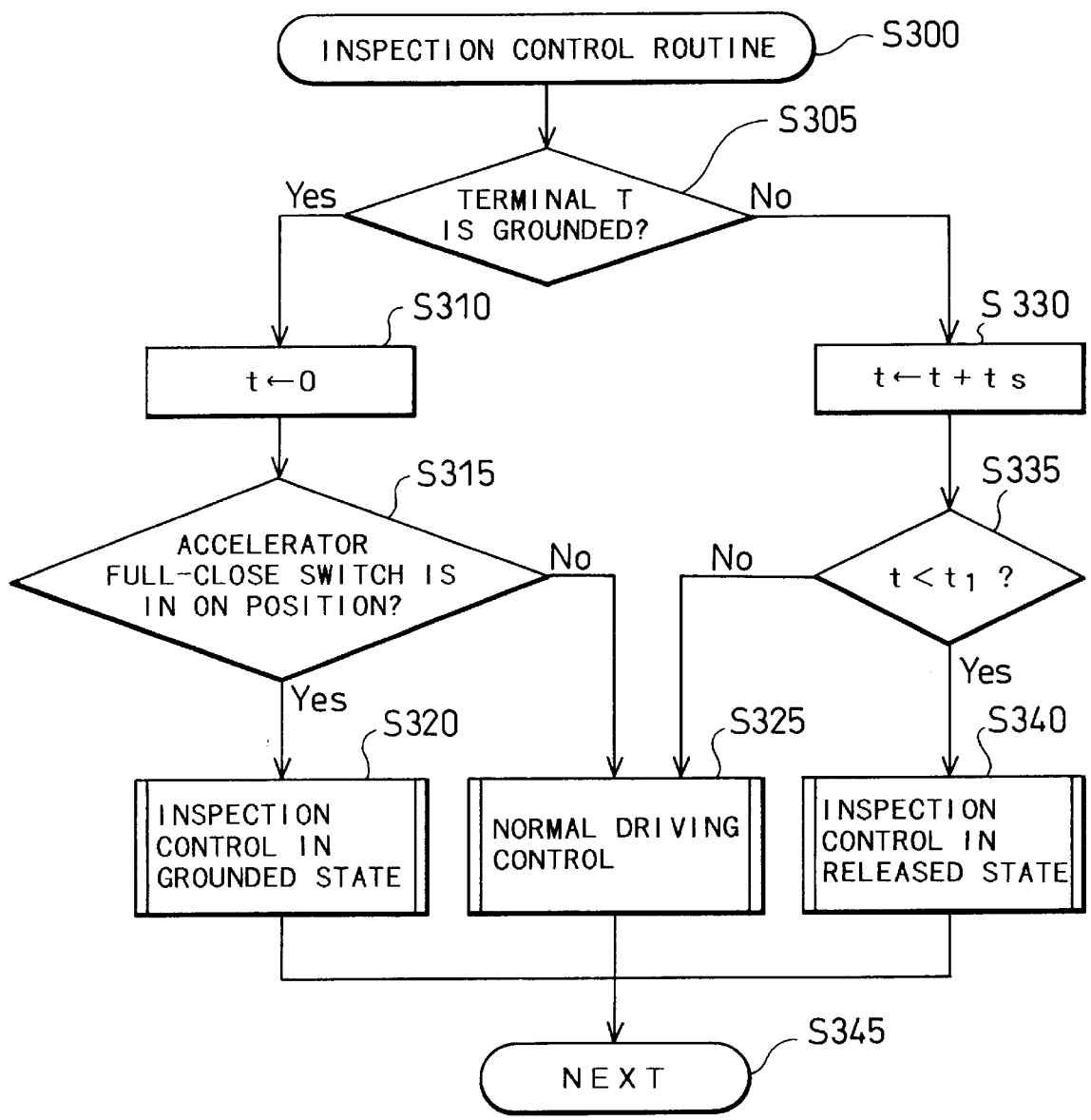
FIG. 2 is a flowchart showing an inspection control routine executed in a first embodiment of the present invention.

FIG. 2 is a flowchart showing a routine of inspection control executed in this embodiment. The routine of inspection control is periodically executed at every fixed time interval ts, while the control unit 190 carries out a variety of control operations.

When the program enters the inspection control routine at step S300, the control unit 190 reads a voltage at the terminal T of the diagnosis connector 172 and determines whether or not the input voltage is equal to the grounded voltage (=0 V) at step S305. The control unit 190 and the diagnosis connector 172 form a detection unit. In case that the terminal T gives the grounded voltage, that is, when the terminal T and the terminal E of the diagnosis connector 172 are linked with each other, the program proceeds to step S310 to set the value 0 to an elapse time counter t. This process resets the elapse time counter t to measure the elapse of time after the release of the connection of the terminal T with the terminal E. The control unit 190 subsequently determines whether the accelerator full-close switch 164b is in ON position or in OFF position at step S315. The on-off state of the accelerator full-close switch 164b determines whether the hybrid vehicle is in the normal driving state or in the course of inspection of the engine 150. When the accelerator full-close switch 164b is in ON position at step S315, the control unit 190 determines that the hybrid vehicle is in the course of inspection of the engine 150 and carries out an inspection control in the grounded state of the terminal T (inspection control in the grounded state) at step S320. When the accelerator full-close switch 164b is in OFF position at step S315, on the other hand, the control unit 190 determines that the hybrid vehicle is in the normal driving state and carries out a normal driving control at step S325. The details of the respective control operations will be discussed later.

The routine of inspection control has the step of determining whether or not the hybrid vehicle is in the course of inspection of the engine 150 or in the normal driving state based on the position of the accelerator full-close switch 164b (step S315). This step enables the hybrid vehicle to run in the normal driving state even when connection of the terminal T with the terminal E is not released by mistake after completion of the inspection. When the terminal T is connected with the terminal E, the engine 150 is driven under the inspection control in the grounded state discussed below. The driving conditions of the engine 150 under the inspection control in the grounded state are different from the driving conditions of the engine 150 required for the normal run. Even when the hybrid vehicle is at a normal run while the connection of the terminal T with the terminal E is not released by mistake after completion of the inspection, the determination at step S315 effectively prevents the engine 150 from being driven under the inspection control in the grounded state.

In case that the terminal T does not give the grounded voltage at step S305, that is, in case that, the connection of the terminal T with the terminal E is released, on the other hand, the control unit 190 adds the value ts to the elapse time counter t at step S330. The value ts represents the cycle at which the routine of inspection control is carried out. This process measures the elapse of time after the connection of the terminal T with the terminal E is released. The control unit 190 subsequently determines whether or not, the elapse time counter t is smaller than a predetermined value t1 at step S335. In case that the elapse time counter t is smaller than the predetermined value t1, that is, in case that the elapse of time after the release of the connection of the terminal T with the terminal E is less than the predetermined value t1, the control unit 190 determines that the hybrid vehicle is in the course of inspection of the engine 150 and carries out an inspection control in the released state of the terminal T (inspection control in the released state) at step S340. In case that the elapse time counter t is not smaller than the predetermined value t1, the control unit 190 determines completion of the inspection of the engine 150 and carries out the normal driving control at step S325. The details of the inspection control in the released state executed at step S340 will be discussed later. The predetermined value t1 corresponds to a time period required for carrying out the inspection while the connection of the terminal T with the terminal E is released, and is set equal to several minutes in this embodiment.

The inspection control in the grounded state (step S320) drives the engine 150 under the conditions corresponding to the inspection items of the engine 150 carried out while the terminal T and the terminal E of the diagnosis connector 172 are linked with each other. For example, when the step-on amount AP of the accelerator pedal input from the accelerator pedal position sensor 164a is equal to zero, that is, when the engine 150 is kept at an idle, the engine 150 is driven to set the ignition timing to the state of a fixed ignition timing advance. The details of this driving state will be discussed later.

As described previously in the normal driving state, the control unit 190 determines whether to start or stop operation of the engine 150 or not, based on the charging state of the battery 194 and other required information, and controls the motor MG1 to start or brake the engine 150 while outputting a signal to instruct a start or a stop of the engine 150 to the EFIECU 170. The EFIECU 170 then starts or stops operation of the engine 150 in response to the output signal. Under the inspection control in the grounded state (step S320), on the other hand, the control unit 190 determines to keep the engine 150 driving irrespective of the charging state of the battery 194 and outputs a signal to instruct the continuous operation of the engine 150. This signal includes the result of detection representing the connecting state of the terminals T and E of the diagnosis connector 172 and information required by the EFIECU 170 to control the driving state of the engine 150, such as the step-on amount AP of the accelerator pedal. The EFIECU 170 receives the output signal to instruct the continuous operation of the engine 150 and thereby keeps the engine 150 driving irrespective of the charging state of the battery 194 under the inspection control in the grounded state.

As described above, in some cases, the engine 150 is driven to set the ignition timing to the state of a fixed ignition timing advance. The ignition timing represents the timing of the vertical motions of the piston 154 of the engine 150 and the ignition of the air/fuel mixture with the ignition plug 162. The ignition timing is controlled by an igniter control signal output from the EFIECU 170 to the igniter 180. The ignition timing is generally controlled to a timing experimentally determined in advance, in order to attain the optimum combustion pressure in each driving state of the engine 150. By taking into account the time lag between the ignition of the air/fuel mixture with the ignition plug 162 and the actual combustion of the air/fuel mixture, the ignition timing is controlled to ignite the ignition plug 162 before the piston 154 reaches an upper dead point (on the side of the ignition timing advance). The ignition timing advance is regulated to realize the adequate ignition timing according to the revolving speed of the engine 150 and the loading in the normal driving state. When the engine 150 is kept at, an idle under the inspection control in the grounded state (step S320), the ignition timing advance is equal to a preset constant value. This is the state of a fixed ignition timing advance. Driving the engine 150 in the state of a fixed ignition timing advance enables measurement and control of the ignition timing.

The normal driving control (step S325) drives the engine 150 under the conditions equal to those of the normal driving state. Namely the engine 150 stops and starts operation according to the charging state of the battery 194 and other required information. The general control flow of the engine 150 is constructed not to carry out the inspection control routine in the normal driving state. The inspection control routine may however, be carried out by mistake, for example, when the hybrid vehicle is at, a normal run while the connection of the terminal T with the terminal E is not released. The normal driving control is carried out in such cases. The normal driving control prevents the inspection control in the grounded state or the inspection control in the released state from being carried out and enables the hybrid vehicle of the embodiment to be run in the normal driving state, even when the hybrid vehicle is at a normal run while the connection of the terminal T with the terminal E is not released by mistake after completion of the inspection of the engine 150.

The inspection control in the released state (step S340) drives the engine 150 according to the driving control that is identical with the driving control carried out in the normal driving state. Namely the ignition timing is controlled according to the revolving speed of the engine 150 in the same manner as the control carried out in the normal driving state. The difference from the normal driving control (step S325) is that the control unit 190 determines to keep the engine 150 driving irrespective of the charging state of the battery 194 and outputs a signal to instruct the continuous operation of the engine 150. This signal includes the result of detection representing the connecting state of the terminals T and E of the diagnosis connector 172 and information required by the EFIECU 170 to control the driving state of the engine 150, such as the step-on amount AP of the accelerator pedal. The EFIECU 170 receives the output signal to instruct the continuous operation of the engine 150 and thereby keeps the engine 150 driving irrespective of the charging state of the battery 194 under the inspection control in the released state. The inspection control in the released state (step S340) keeps the engine 150 driving under the driving conditions similar to those in the normal driving state. For example, inspection of the exhaust is accordingly carried out, to determine whether or not the toxic components included in the exhaust, such as CO and HC, are not greater than reference values.

As described above, under the inspection control in the grounded state (step S320) and under the inspection control in the released state (step S340), the engine 150 is kept driving irrespective of the charging state of the battery 194. Under these inspection controls (steps S320 and S340), charging the battery 194 that is close to the full charge may be continued in the time period required for the inspection. The charging control of the battery 194 may thus be carried out in addition to the respective inspection controls. The charging control of the battery 194 is carried out to prevent the battery 194 from being charged excessively. For example, the charging control may prevent the battery 194 from being charged during inspection of the operation of the engine 150. In another example, the charging control may prevent the battery 194 from being charged when the charging state of the battery 194 is closer to the full charge than a predetermined level. In still another example, the charging control may start and stop the charging operation according to the charging state of the battery 194, in order to keep the charging state of the battery 194 in an adequate range.

Figure 9A:
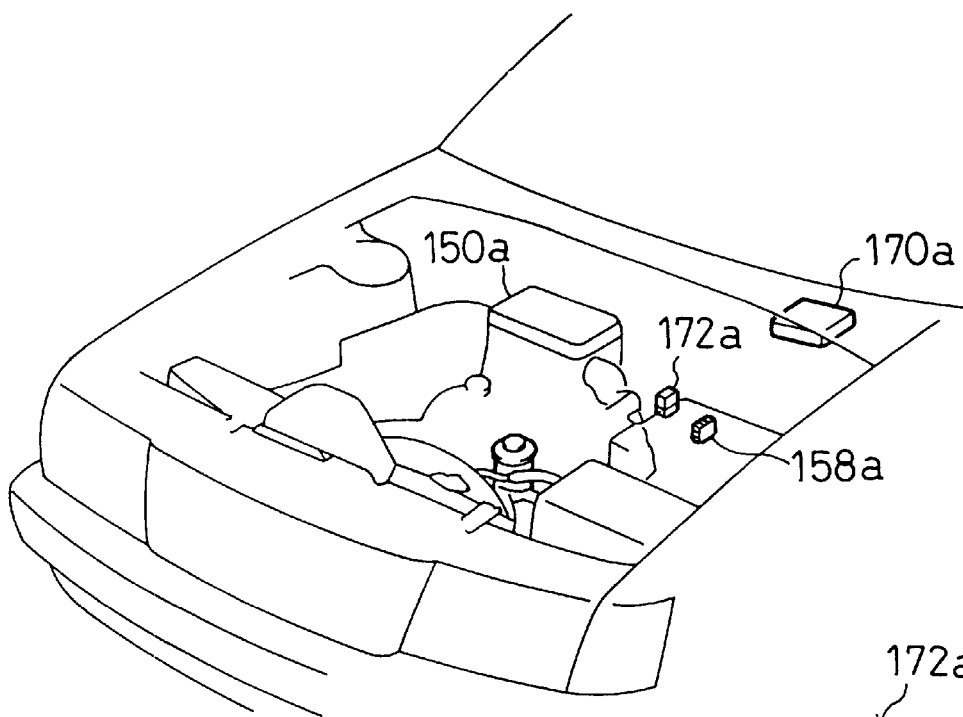
FIG. 9 schematically illustrates an engine room in a conventional vehicle.
Figure 9B:
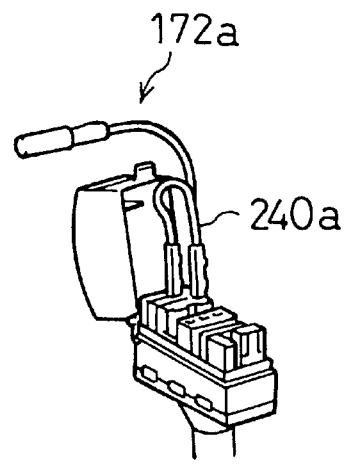
Figure 9C:
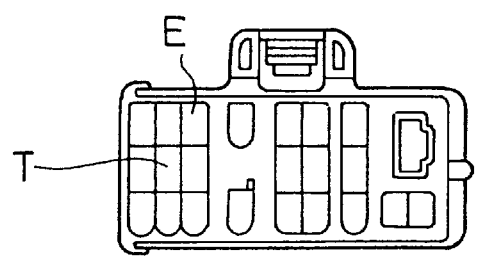

In the structure of the embodiment, when it is required to inspect the operation of the internal combustion engine in the hybrid vehicle, the same procedure as the inspection in the conventional vehicle shown in FIG. 9, that is, the procedure of connecting the terminals T and E of the diagnosis connector 172 with each other via the check wire 240a, is carried out and enables the engine 150 to be driven under the inspection control in the grounded state (step S320). Predetermined inspection of the engine 150 can thus be carried out irrespective of the charging state of the battery 194. No additional process that is different from the procedure in the conventional vehicle is required for inspection of the engine 150. This accordingly reduces the possibility of confusion or mistake in the inspection.

In the structure of the embodiment, after the inspection under the connection of the terminal T with the terminal E is concluded, the release of the connection of these terminals T and E enables the engine 150 to be driven under the inspection control in the released state (step S340), that is, under the driving conditions similar to those in the normal driving state, for several minutes. Predetermined inspection, such as inspection of the exhaust, can thus be carried out irrespective of the charging state of the battery 194.

The structure of this embodiment further enables inspection of the exhaust to be carried out under desired conditions. The inspection of the exhaust checks the exhaust from the engine 150 for the non-existence of toxic components in the normal driving state. It is accordingly desirable that the wires non-required in the normal driving state, for example, the terminals of the diagnosis connector 172, are not connected to the engine 150 during the inspection. In this embodiment, none of the terminals of the diagnosis connector 172 are interconnected during the inspection of the exhaust. The structure of the embodiment thus enables the inspection of the exhaust to be carried out in this desirable state.

After the inspection in the released state of the connection of the terminal T with the terminal E has been concluded, that is, after the elapse of time has reached the predetermined value t1 since the release of the connection of both the terminals, the determination at step S335 always gives the negative answer to carry out the normal driving control (step S325). Even when the inspection control routine is executed by mistake at a normal run, this structure enables the hybrid vehicle to run in the normal driving state. Although there is no indication in the flowchart of FIG. 2 for the clarity of explanation, a predetermined upper limit is set to the elapse time counter t at step S330. In case that no upper limit is set to the elapse time counter t, when an extremely long time has elapsed since the release of the connection of the terminal T with the terminal E, the elapse time counter t may overflow. The overflow may result in a mistake in the determination at step S330.

The structure of this embodiment determines whether or not the engine 150 is in the course of inspection based on the position of the accelerator full-close switch 164b (step S315), and prevents the inspection control in the grounded state (step S320) or the inspection control in the released state (step S340) from being carried out by mistake at a normal run, thereby enabling the hybrid vehicle to run in the normal driving state. Another procedure may attain the same effects. The inspection of the operation of the engine 150 is generally carried out when the gearshift position is in Parking (P range) or Neutral (N range) and the vehicle is at a stop. One possible procedure thus activates the inspection control routine (step S300) only when the signal output from the gearshift position sensor 184 represents either the P range or the N range and the vehicle speed is equal to zero. The inspection of the operation of the engine 150 is generally carried out at a revolving speed of not greater than a predetermined level. Another possible procedure thus activates the inspection control routine (step S300) only when the revolving speed of the engine 150 is not greater than the predetermined level. The predetermined level may be set equal to the sum of a certain margin and an allowable upper limit of the revolving speed of the engine 150 during the inspection.

In this embodiment, the inspection control routine is executed at the fixed time intervals ts, and this value ts is added to the elapse time counter t every time when the inspection control routine is carried out. This structure accordingly measures the elapse of time after the release of the connection of the terminal T with the terminal E. There are, however, other applicable procedures. By way of example, one application measures the elapse of time with a timer that works regardless of the various processes executed by the engine controller. Other structures are also applicable to determine whether or not the elapse of time has reached a predetermined time period. For example, one application determines whether or not an accumulated revolving speed of the engine 150 has reached a predetermined level to determine the elapse of the predetermined time period. Another application measures a variation in water temperature in the engine measured by a water temperature sensor 174 in the engine 150 to determine the elapse of the predetermined time period.

The following describes structure of a second embodiment according to the present invention. A hybrid vehicle with an engine controller of the second embodiment mounted thereon has the same structure as that of the first embodiment shown in FIG. 1. In the second embodiment, the diagnosis connector 172 has an additional terminal for inspection in addition to the terminals provided in the conventional vehicle. Although not being specifically illustrated, the additional terminal for inspection is similar to the terminals T and E shown in FIG. 9C. The additional terminal for inspection is connected to a signal input unit of the EFIECU 170 and pulled up to a voltage unit of a predetermined voltage. The additional terminal for inspection is linked with the terminal E to give the grounded voltage during the inspection of the engine 150.

Figure 3:
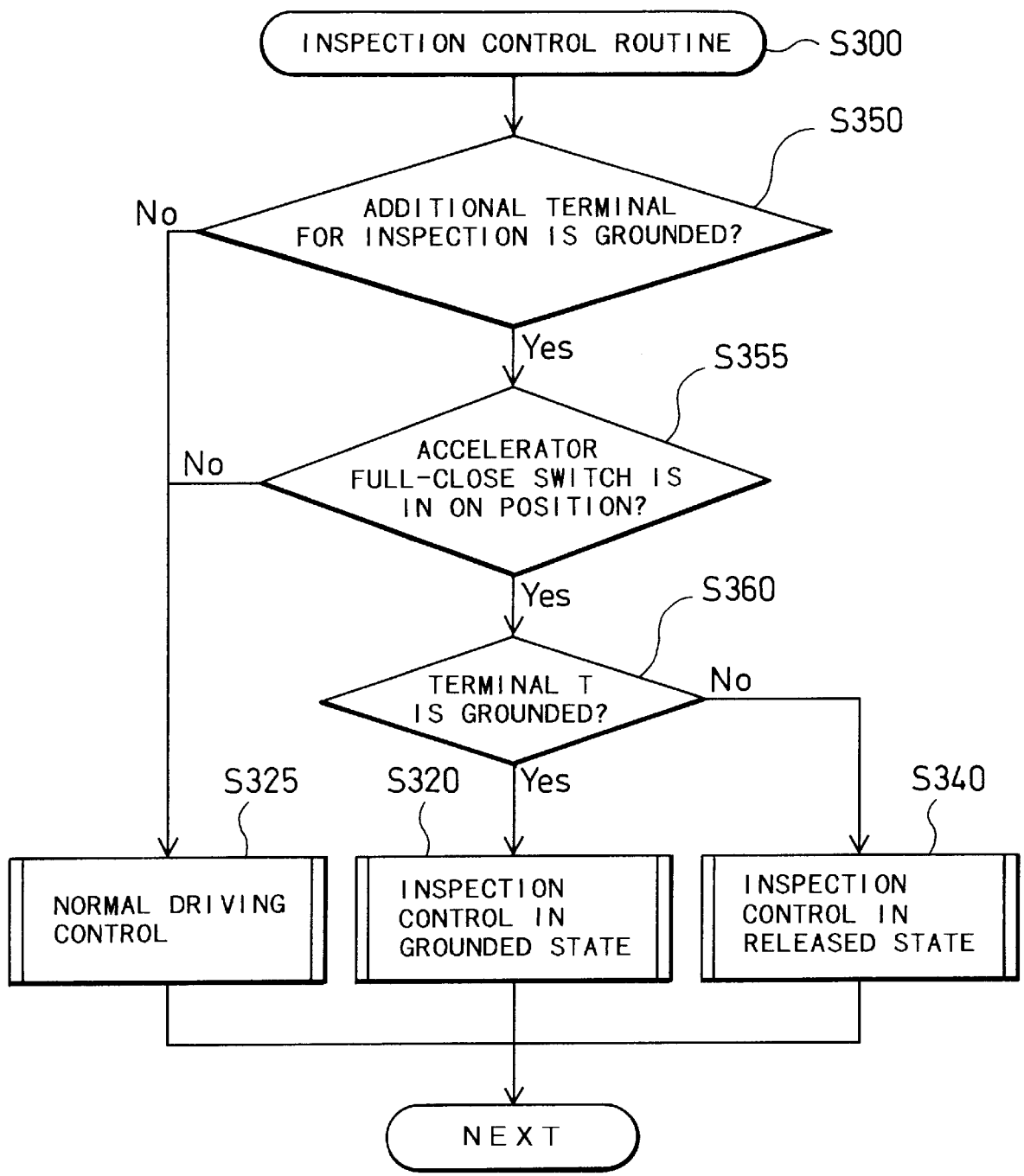
FIG. 3 is a flowchart showing an inspection control routine executed in a second embodiment of the present invention.

FIG. 3 is a flowchart showing a routine of inspection control executed in the second embodiment. The routine of inspection control is executed at a predetermined timing, while the control unit 190 carries out a variety of control operations. Unlike the first embodiment, the predetermined timing may not be a fixed time period as discussed later.

When the program enters the inspection control routine at step S300, the control unit 190 reads a voltage at the additional terminal for inspection and determines whether or not the input voltage is equal to the grounded voltage (=0 V) at step S350. In case that the additional terminal for inspection does not give the grounded voltage, the control unit 190 determines that the engine 150 is not in the course of inspection and carries out the normal driving control at step S325. The normal driving control (step S325) executed in the second embodiment is the same as that executed in the first embodiment.

In case that the additional terminal for inspection gives the grounded voltage at step S350, that is, in case that the additional terminal for inspection is connected to the terminal E via the check wire 240a, on the other hand, it is further determined whether or not the accelerator full-close switch 164b is in ON position or in OFF position at step S355. Like the first embodiment, the on-off state of the accelerator full-close switch 164b determines whether the hybrid vehicle is in the normal driving state or in the course of inspection of the engine 150. When the accelerator full-close switch 164b is in OFF position at step S355, the control unit 190 determines that the hybrid vehicle is in the normal driving state and carries out a normal driving control at step S325.

When the accelerator full-close switch 164b is in ON position at step S355, on the other hand, the control unit 190 determines that the hybrid vehicle is in the course of inspection of the engine 150 and reads a voltage at the terminal T and determines whether or not the input voltage is equal to the grounded voltage at step S360. In case that the terminal T gives the grounded voltage, the control unit 190 carries out the inspection control in the grounded state at step S320. In case that the terminal T does not give the grounded voltage, on the contrary, the control unit 190 carries out the inspection control in the released state at step S340. The inspection control in the grounded state (step S320) and the inspection control in the released state (step S340) executed in the second embodiment are the same as those executed in the first embodiment. Like the first embodiment, the charging control may be carried out in the second embodiment. For example, the charging control may prevent the battery 194 from being charged during inspection of the operation of the engine 150. In another example, the charging control may prevent the battery 194 from being charged when the charging state of the battery 194 is closer to the full charge than a predetermined level. In still another example, the charging control may start and stop the charging operation according to the charging state of the battery 194, in order to keep the charging state of the battery 194 in an adequate range.

The engine controller of the second embodiment keeps the engine 150 driving irrespective of the charging state of the battery 194 when the additional terminal for inspection is connected to the terminal E. This structure enables a predetermined inspection of the internal combustion engine mounted on the hybrid vehicle to be carried out without significant troubles. The structure of the second embodiment keeps the engine 150 driving irrespective of the connecting state of the terminal T with the terminal E in case that the additional terminal for inspection connects with the terminal E. This structure ensures the sufficient time that enables inspection of the exhaust to be securely carried out in the released state of the connection of the terminal T with the terminal E. The structure of the second embodiment does not use the elapse time counter and thereby does not require the inspection control routine to be executed periodically at fixed time intervals. This allows the relationship between the inspection control routine and the other processes to be flexibly designed in the control of the internal combustion engine.

Like the first embodiment, the second embodiment may have the structure of preventing the inspection control in the grounded state (step S320) or the inspection control in the released state (step S340) from being carried out mistakenly at a normal run. For example, one possible structure activates the inspection control routine (step S300) only when the signal output from the gearshift position sensor 184 represents either the P range or the N range and the vehicle speed is equal to zero. Another possible structure activates the inspection control routine (step S300) only when the revolving speed of the engine 150 is not greater than a predetermined level.

Figure 4:
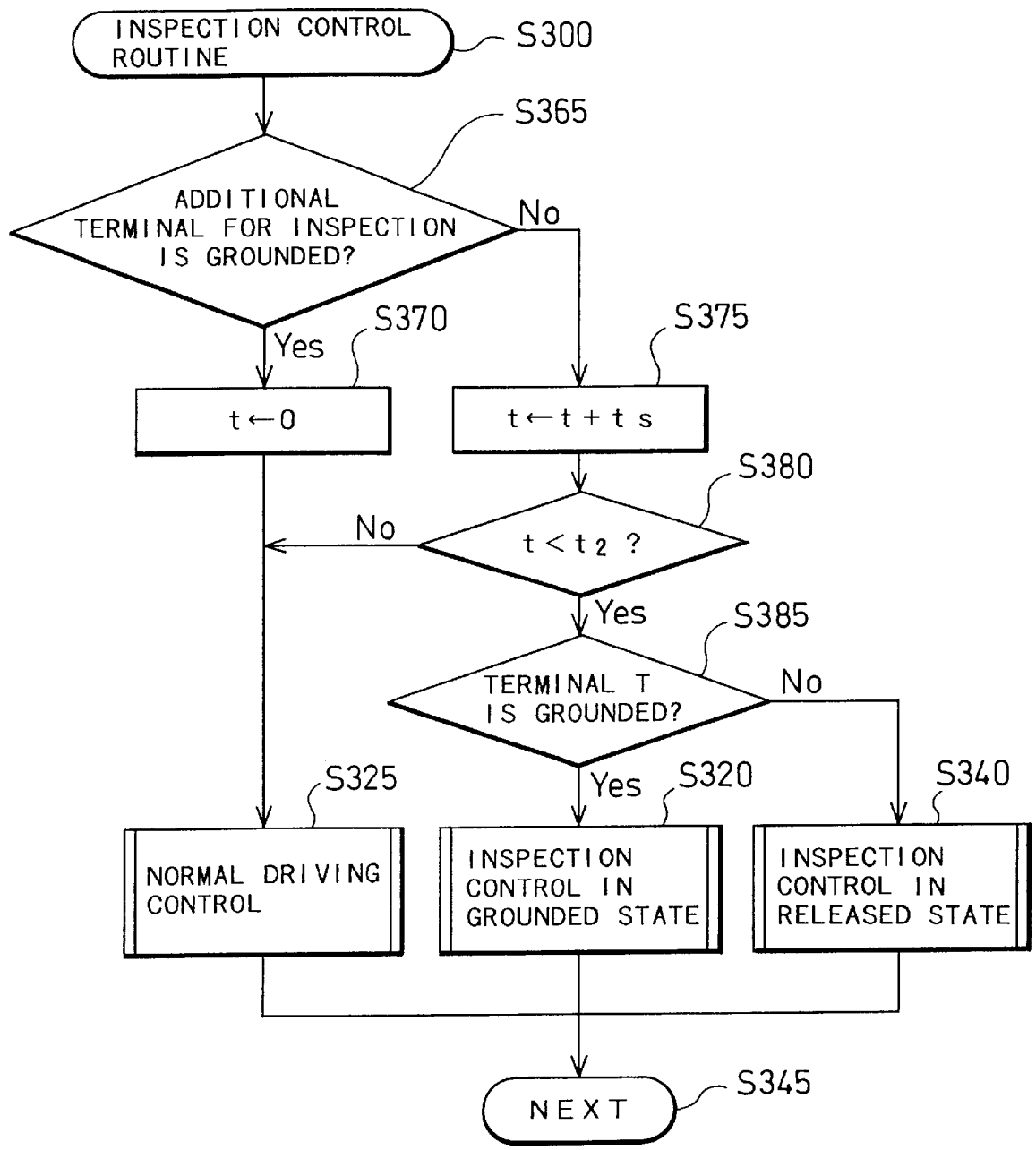
FIG. 4 is a flowchart showing an inspection control routine executed in a third embodiment of the present invention.

FIG. 4 is a flowchart showing a routine of inspection control executed in a third embodiment. The structure of the third embodiment is identical with the structure of the second embodiment and the only difference from the second embodiment is the flow of the inspection control routine. Like the first embodiment, the inspection control routine of the third embodiment is periodically executed at every fixed time interval ts in the control of the internal combustion engine.

When the program enters the inspection control routine at step S300, the control unit 190 reads a voltage at the additional terminal for inspection and determines whether or not the input voltage is equal to the grounded voltage (=0 V) at step S365. In case that the additional terminal for inspection gives the grounded voltage, the program proceeds to step S370 to set the value 0 to the elapse time counter t. This process resets the elapse time counter t to measure the elapse of time after the release of the connection of the additional terminal for inspection with the terminal E. The control unit 190 subsequently carries out the normal driving control at step S325 and once exits from the inspection control routine at step S345. This means that the third embodiment does not carry out the inspection control when the additional terminal for inspection gives the grounded voltage. The normal driving control (step S325) executed in the third embodiment is identical with that executed in the first embodiment.

In case that the additional terminal for inspection does not give the grounded voltage at step S365, on the other hand, the control unit 190 adds the value ts to the elapse time counter t at step S375. The value ts represents the cycle at which the routine of inspection control is carried out. This process measures the elapse of time after the connection of the additional terminal for inspection with the terminal E is released. The control unit 190 subsequently determines whether or not the elapse time counter t is smaller than a predetermined value t2 at step S380. In case that the elapse time counter t is not smaller than the predetermined value t2, the control unit 190 determines completion of the inspection of the engine 150 and carries out the normal driving control at step S325.

In case that the elapse time counter t is smaller than the predetermined value t2, on the other hand, the control unit 190 determines that the inspection of the engine 150 is in progress and reads a voltage at the terminal T and determines whether or not the input voltage is equal to the grounded voltage at step S385. In case that the terminal T gives the grounded voltage, that is, in case that the terminal T is connected with the terminal E via the check wire 240a, the control unit 190 carries out the inspection control in the grounded state at step S320. In case that the terminal T does not give the grounded voltage, on the contrary, the control unit 190 carries out the inspection control in the released state at step S340. The inspection control in the grounded state (step S320) and the inspection control in the released state (step S340) executed in the third embodiment are the same as those executed in the first embodiment. Like the first embodiment, the charging control may be carried out in the third embodiment. For example, the charging control may prevent the battery 194 from being charged during inspection of the operation of the engine 150. In another example, the charging control may prevent the battery 194 from being charged when the charging state of the battery 194 is closer to the full charge than a predetermined level. In still another example, the charging control may start and stop the charging operation according to the charging state of the battery 194, in order to keep the charging state of the battery 194 in an adequate range.

The predetermined value t2 is set corresponding to the time period required for the inspection of the engine 150. In the first embodiment, the value t1 is set equal to several minutes required for the inspection control in the released state (step S340). In the third embodiment, however, the value t2 is set corresponding to the time period required for both the inspection control in the grounded state (step S320) and the inspection control in the released state (step S340).

The structure of the third embodiment keeps the engine 150 driving irrespective of the charging state of the battery 194 until a predetermined time period has elapsed since the release of the connection of the additional terminal for inspection with the terminal E, that is, after the voltage of the additional terminal for inspection once becomes equal to the grounded voltage and returns to the normal level. This structure enables predetermined inspection of the engine 150. After the completion of the predetermined inspection, the engine 150 is driven in the normal driving state irrespective of the connecting state of the terminal T with the terminal E. This prevents the engine 150 from being applied to a normal run by mistake while the connection of the terminal T with the terminal E is not released. Like the first embodiment, the structure of the third embodiment enables inspection of the exhaust to be carried out in a desirable state.

Like the first embodiment, the third embodiment may have the structure of preventing the inspection control in the grounded state (step S320) or the inspection control in the released state (step S340) from being carried out mistakenly at a normal run. For example, one possible structure activates the inspection control routine (step S300) only when the signal output from the gearshift position sensor 184 represents either the P range or the N range and the vehicle speed is equal to zero. Another possible structure activates the inspection control routine (step S300) only when the revolving speed of the engine 150 is not greater than a predetermined level. In the same manner as those in the first embodiment, a variety of structures are applicable to determine the elapse of a predetermined time period in the third embodiment.

Figure 5:
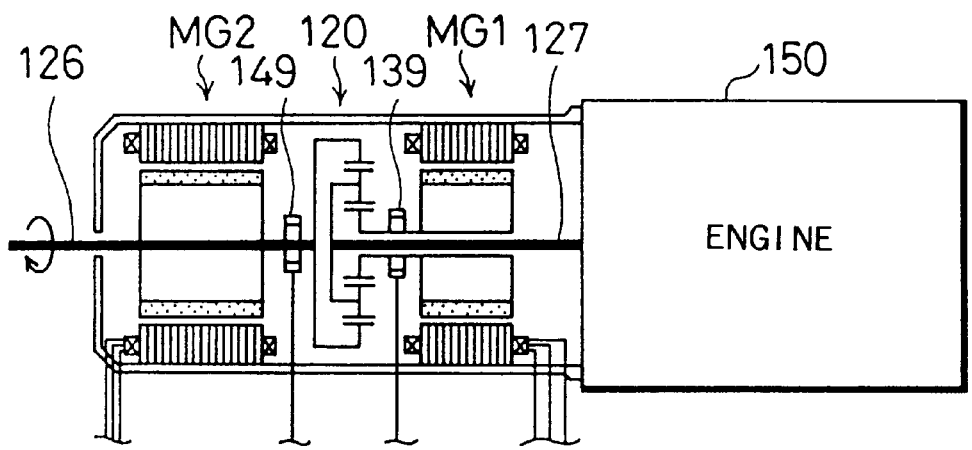
FIG. 5 schematically illustrates another structure of a hybrid vehicle to which the present invention is applicable.
Figure 6:
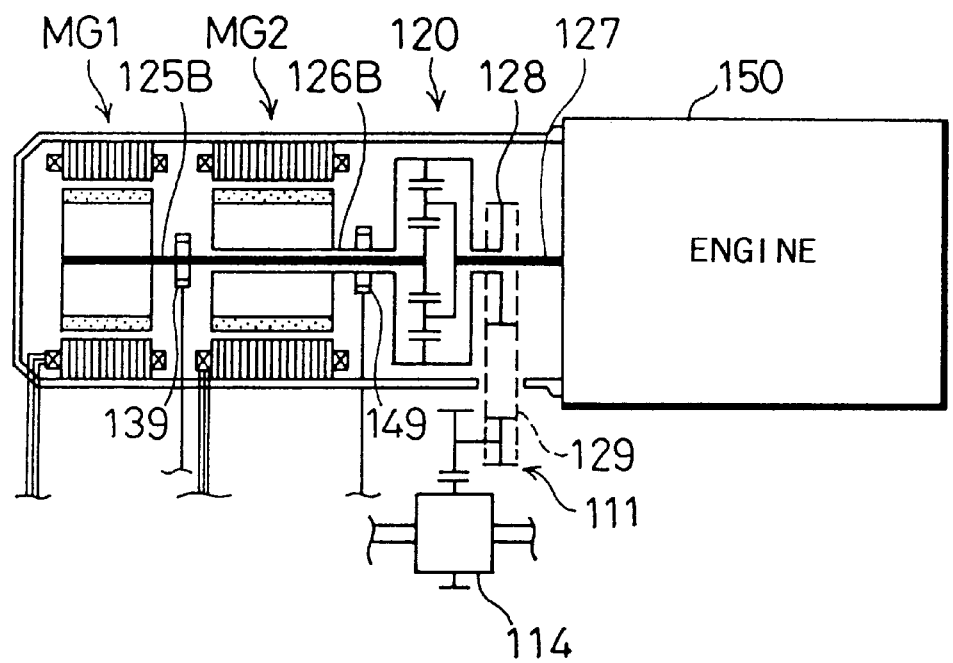
FIG. 6 schematically illustrates still another structure of a hybrid vehicle to which the present invention is applicable.

The above discussion regards the variety of inspection control routines. The hybrid vehicle to which these embodiments are applied may have a variety of structures. In the structure of the hybrid vehicle shown in FIG. 1, the driving forces of the engine 150 and the motor MG2 are transmitted to the driving wheels 116 and 118 via the planetary gear 120. FIGS. 5 and 6 show other examples of the connection of the engine 150 and the motors MG1 and MG2 via the planetary gear 120. In the structure of FIG. 1, the power output to the ring gear shaft 126 is taken out of the place between the motors MG1 and MG2 via the power feed gear 128 connected with the ring gear 122. In the modified example of FIG. 5, the power is taken out of an extension of the ring gear shaft 126. In the modified example of FIG. 6, the engine 150, the planetary gear 120, the motor MG2, and the motor MG1 are arranged in this sequence. In this case, a sun gear shaft 125B is not required to be hollow, whereas a ring gear shaft 126B is required to be hollow. In this structure, the power output to the ring gear shaft 126B is taken out of the place between the engine 150 and the motor MG2. Although not being specifically illustrated, the motors MG2 and MG1 may be replaced with each other in the structure of FIG. 6.

Figure 7:
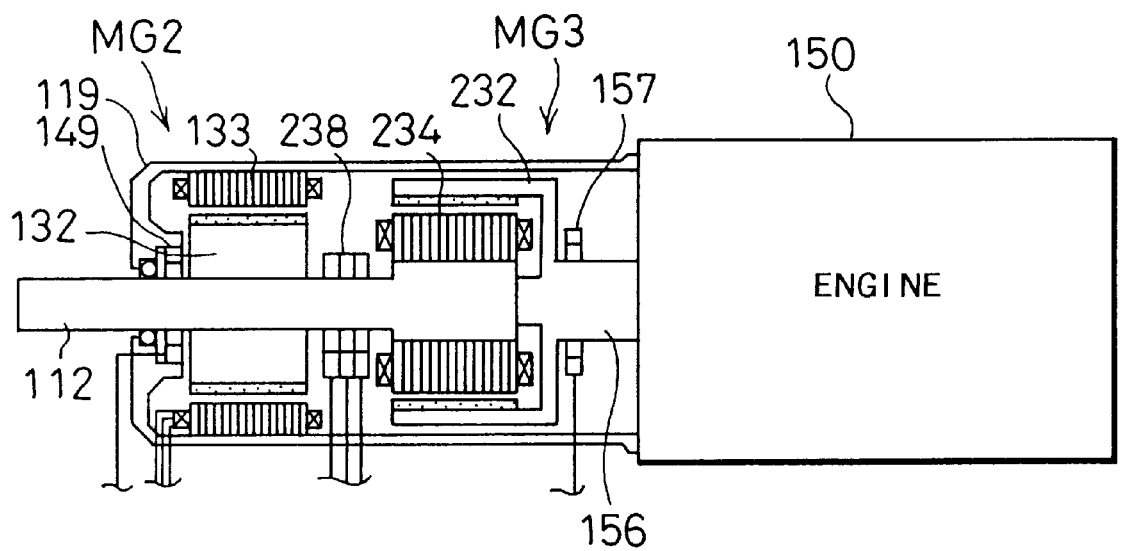
FIG. 7 schematically illustrates structure of a hybrid vehicle with a clutch motor MG3.

Although the above modified examples use the planetary gear 120, another possible structure does not include the planetary gear 120 as shown in FIG. 7. In the structure of FIG. 7, a clutch motor MG3 that functions as an electromagnetic coupling and has a rotor (inner rotor) 234 and a stator (outer rotor) 232, which are rotatable about an identical axis relative to each other, is used in place of the motor MG1 and the planetary gear 120 included in the structure of FIG. 1. The outer rotor 232 of the clutch motor MG3 is mechanically linked with the crankshaft 156 of the engine 150, whereas the inner rotor 234 of the clutch motor MG3 and the rotor 132 of the motor MG2 are linked with a drive shaft 112. The stator 133 of the motor MG2 is fixed to the casing 119. In this structure, instead of the planetary gear 120, the clutch motor MG3 is used for distribution of energy. The electrical energy input into and output from the clutch motor MG3 is used to regulate the relative rotation of the inner rotor 234 to the outer rotor 232 and causes the power of the engine 150 to be transmitted to the drive shaft 112. Since the rotor 132 of the motor MG2 is attached to the drive shaft 112, the motor MG2 may also be used as a driving source. The power of the engine 150 may also be used to cause the motor MG3 to generate electric power. The principle of the present invention is effectively applicable to the hybrid vehicle of this structure since the engine 150 starts and stops operation according to the remaining charge of the battery 194 at a normal run.

Figure 8:
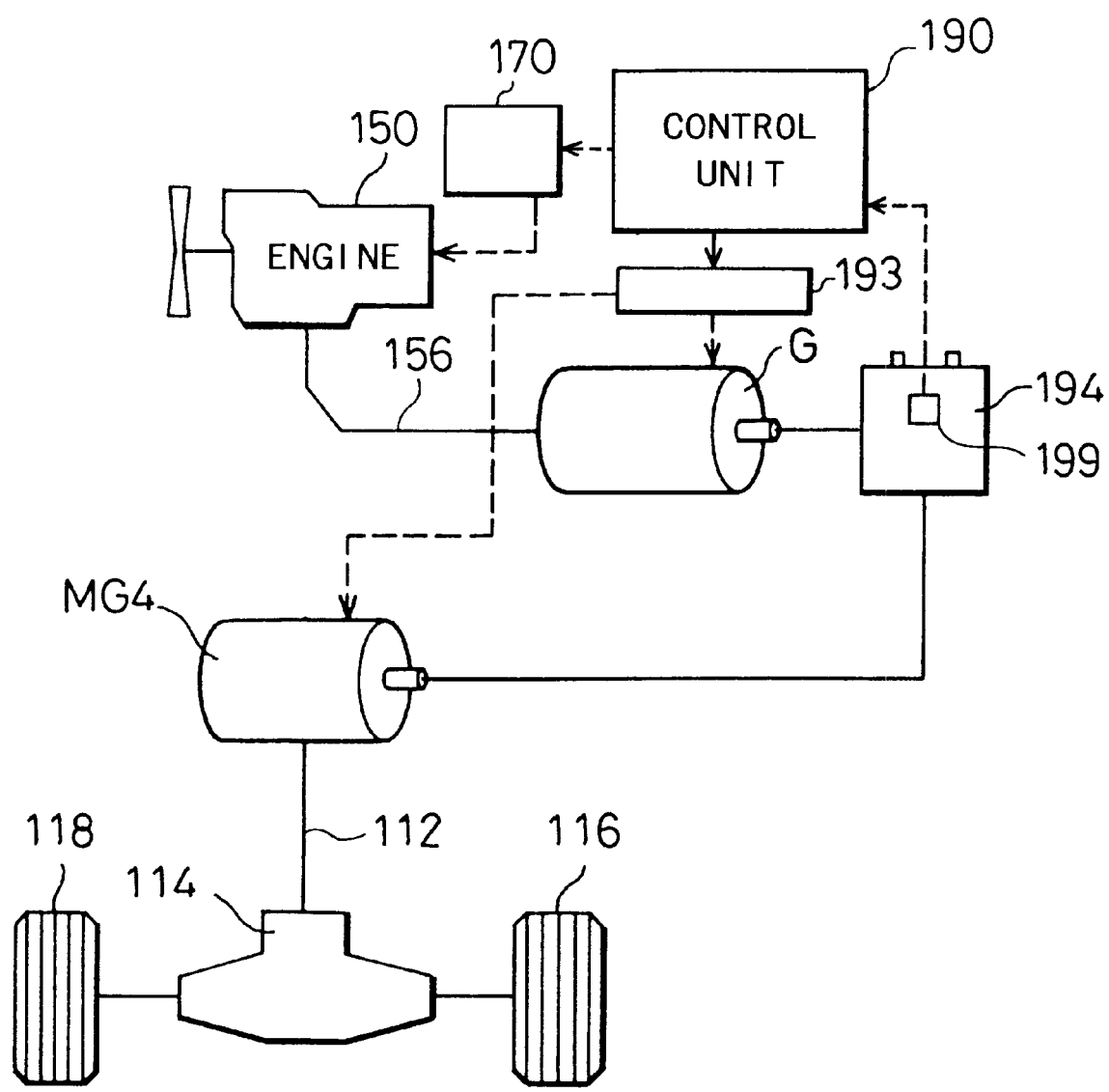
FIG. 8 schematically illustrates structure of a series-type hybrid vehicle.

The hybrid vehicle may have a series-type structure as shown in FIG. 8. In the series-type hybrid vehicle, the power of the engine 150 is not transmitted to the driving wheels 116 and 118 but is used for driving a generator G. The vehicle is driven with a motor MG4 that is activated by the electric power supplied from the battery 194. The principle of the present invention is effectively applicable to this structure since the engine 150 starts and stops operation according to the remaining charge of the battery 194 at a normal run.

The present invention is not restricted to the above embodiments, but there may be many modifications, changes, and alterations without departing from the scope or spirit of the main characteristics of the present invention.

It, should be clearly understood that the above embodiments are only illustrative and not restrictive in any sense. The scope and spirit of the present invention are limited only by the terms of the appended claims.

What is claimed is:

1. An apparatus for controlling operation of an internal combustion engine in a hybrid vehicle with said internal combustion engine and a motor mounted thereon, said apparatus comprising:

an operation stop unit which stops operation of said internal combustion engine when an essential condition characteristic of said hybrid vehicle is satisfied among conditions for stopping the operation of said internal combustion engine;

a detection unit which determines an inspection of the operation of said internal combustion engine is in progress; and a continuous operation control unit which controls the operation of said internal combustion engine when said detection unit determines that the inspection of the operation of said internal combustion engine is in progress, and thereby keeps a predetermined driving state suitable for the inspection of the operation of said internal combustion engine even when the essential condition characteristic of said hybrid vehicle is satisfied among the conditions for stopping the operation of said internal combustion engine.

2. An apparatus in accordance with claim 1, said apparatus further comprising:

an output unit which outputs a drive control signal to instruct a drive of said internal combustion engine in the predetermined driving state suitable for the inspection, wherein said detection unit carries out the determination based on detection of the drive control signal.

3. An apparatus in accordance with claim 1, said apparatus further comprising:

an output unit which outputs a drive control signal to instruct a drive of said internal combustion engine in the predetermined driving state suitable for the inspection, wherein said detection unit determines that the inspection of the operation of said internal combustion engine is in progress while the drive control signal is detected and until a predetermined time period has elapsed since the drive control signal was changed from a state of detection to a state of non-detection.

4. An apparatus for controlling operation of an internal combustion engine in a hybrid vehicle with said internal combustion engine and a motor mounted thereon, said apparatus comprising:
- a first electronic control unit which stops operation of said internal combustion engine when an essential condition characteristic of said hybrid vehicle is satisfied among conditions for stopping the operation of said internal combustion engine;
- an inspection terminal which is used only to inspect the operation of said internal combustion engine; and
- a second electronic control unit which detects a connecting state of said inspection terminal and controls the operation of said internal combustion engine at least when it detects a connecting state that is supposed to be detected during the inspection of the operation of said internal combustion engine, and thereby keeps a predetermined driving state suitable for the inspection of the operation of said internal combustion engine even when the essential condition characteristic of said hybrid vehicle is satisfied among the conditions for stopping the operation of said internal combustion engine.

5. A method of controlling operation of an internal combustion engine in a hybrid vehicle with said internal combustion engine and a motor mounted thereon, said method comprising the steps of:
- (a) determining an inspection of operation of said internal combustion engine is in progress;
- (b) stopping the operation of said internal combustion engine when an essential condition characteristic of said hybrid vehicle is satisfied among conditions for stopping the operation of said internal combustion engine and when it is determined in said step (a) that the inspection of the operation of said internal combustion engine is not in progress; and
- (c) controlling the operation of said internal combustion engine when it is determined in said step (a) that the inspection of the operation of said internal combustion engine is in progress, and thereby keeping a predetermined driving state suitable for the inspection of the operation of said internal combustion engine even when the essential condition characteristic of said hybrid vehicle is satisfied among the conditions for stopping the operation of said internal combustion engine.

* * * * *